United States Patent [19]

Sato

[11] 4,007,485
[45] Feb. 8, 1977

[54] COLOR VIDEO SIGNAL REPRODUCING APPARATUS

[75] Inventor: Nobuaki Sato, Atsugi, Japan

[73] Assignee: Sony Corporation, Tokyo, Japan

[22] Filed: Mar. 31, 1975

[21] Appl. No.: 563,517

[30] Foreign Application Priority Data

Apr. 8, 1974 Japan .............................. 49-39686

[52] U.S. Cl. .................................... 358/8; 358/36; 358/40

[51] Int. Cl.² .................. H04N 5/795; H04N 9/535

[58] Field of Search ................. 358/8, 4, 27, 36, 9, 358/26, 40; 360/27

[56] References Cited

UNITED STATES PATENTS

| | | | |
|---|---|---|---|
| 3,501,585 | 3/1970 | De Lange | 360/27 |
| 3,626,087 | 12/1971 | Tomioka | 358/4 |
| 3,715,462 | 2/1973 | Krause | 358/27 |
| 3,740,462 | 6/1973 | Harwood | 358/27 |
| 3,852,808 | 12/1974 | Sadashige | 358/8 |
| 3,947,871 | 3/1976 | Amari et al. | 358/8 |

Primary Examiner—Robert L. Griffin
Assistant Examiner—Mitchell Saffian
Attorney, Agent, or Firm—Lewis H. Eslinger; Alvin Sinderbrand

[57] ABSTRACT

Successive field intervals of a composite color television signal are respectively recorded on successive recording tracks which extend parallel to one another on a record medium such as a magnetic tape. During the reproduction of a color television signal in a conventional VTR (video tape recorder), successive field intervals of the color television signal are alternately reproduced from the successive record tracks by means of two signal reproducing heads which are switched alternately.

A color video signal reproducing circuit has an automatic gain control circuit for controlling the output level thereof and a muting circuit by which operation of the automatic gain control circuit is arrested for a predetermined period at the commencement of each interval of the reproduced color video signal so as to prevent color flicker from appearing on a television monitor regardless of timing axis variations caused by undesirable jitter components produced by the speed relation between the tape transport or drive and the head rotation in the VTR.

8 Claims, 9 Drawing Figures

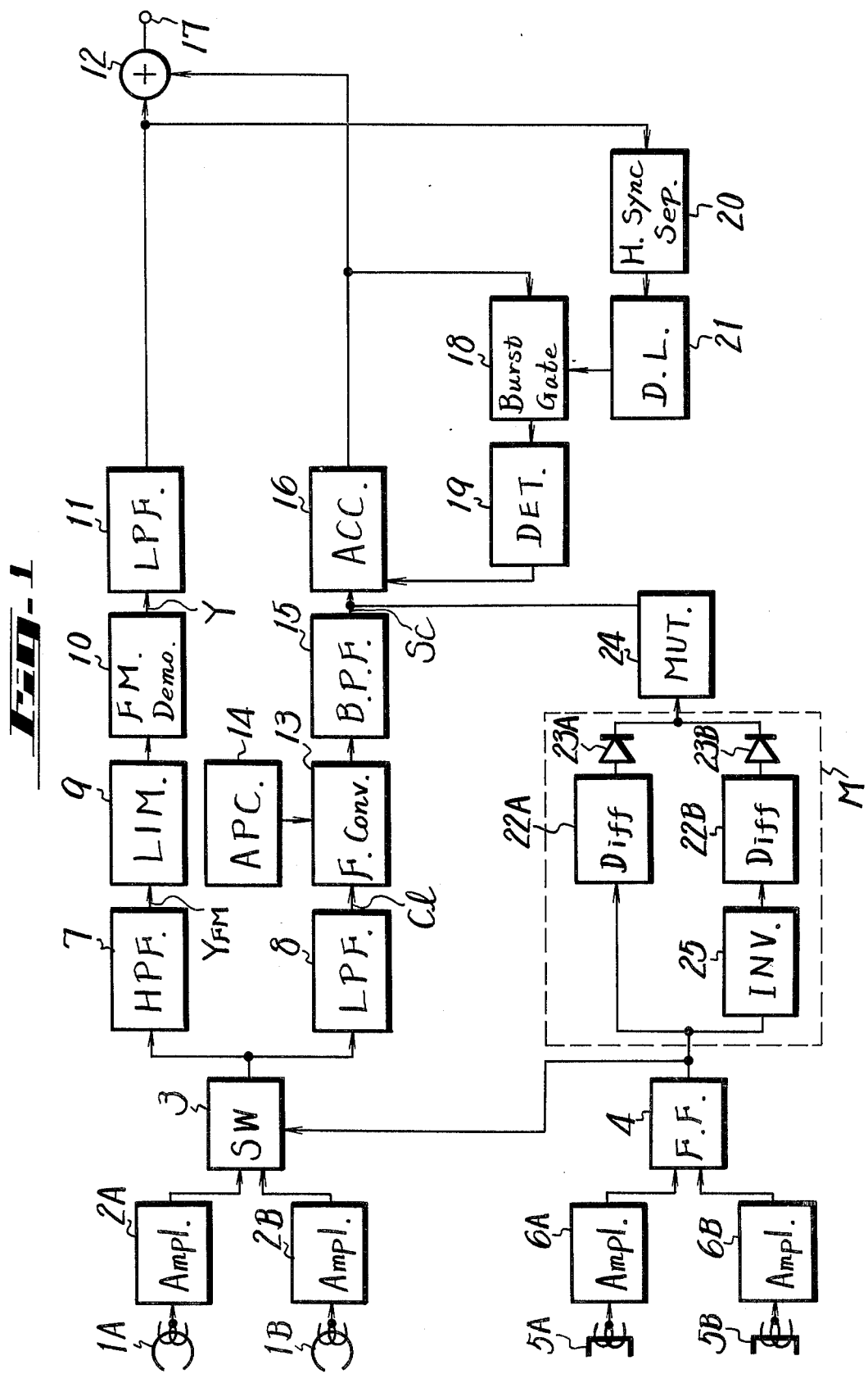

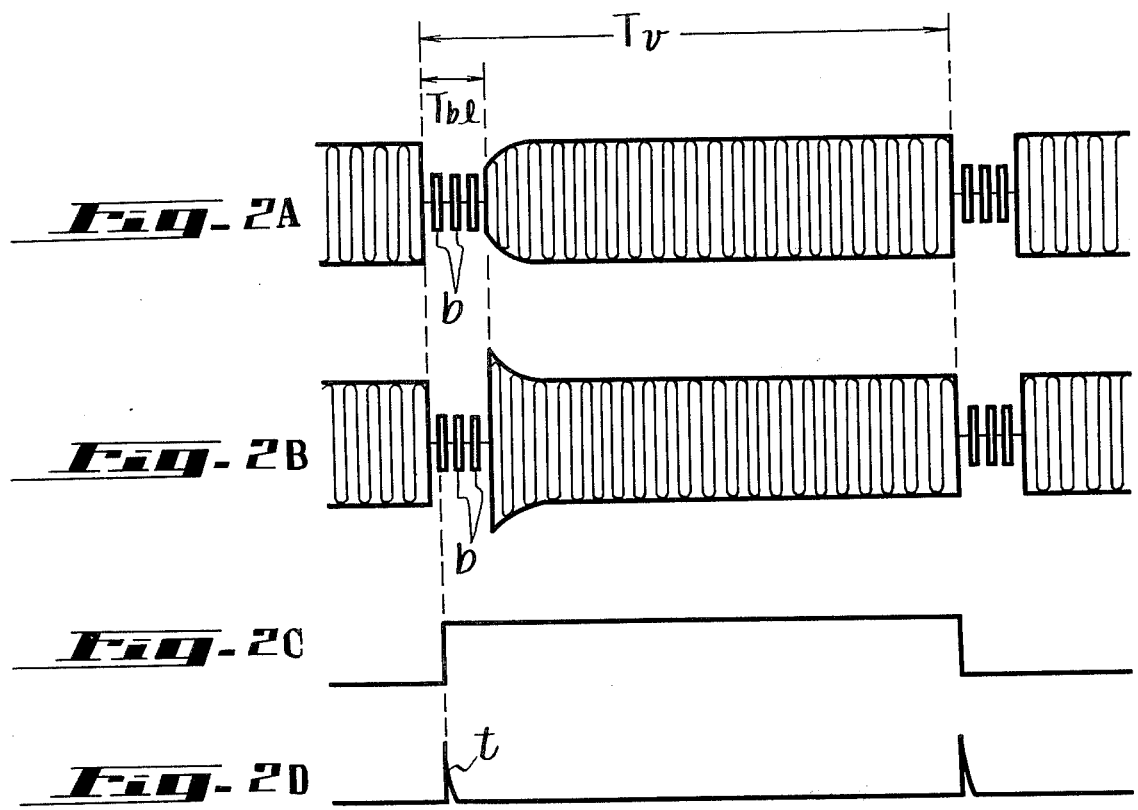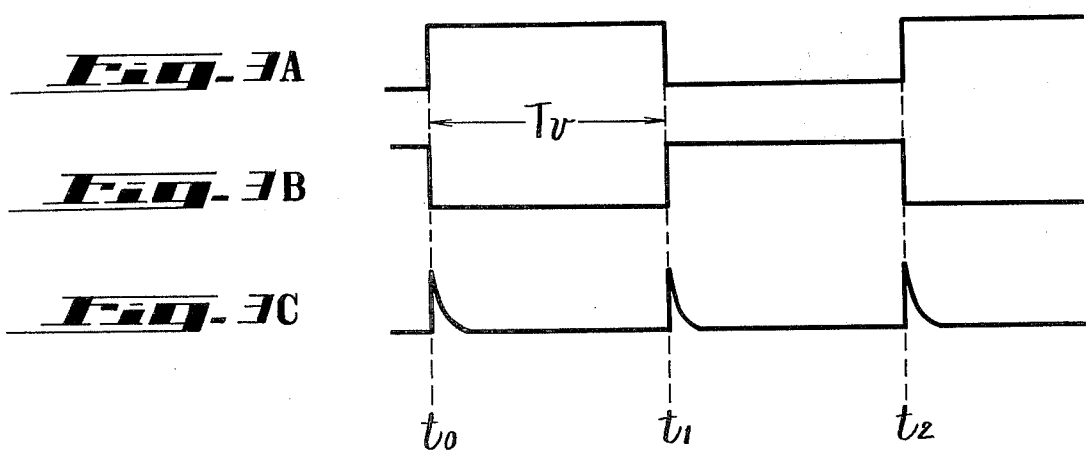

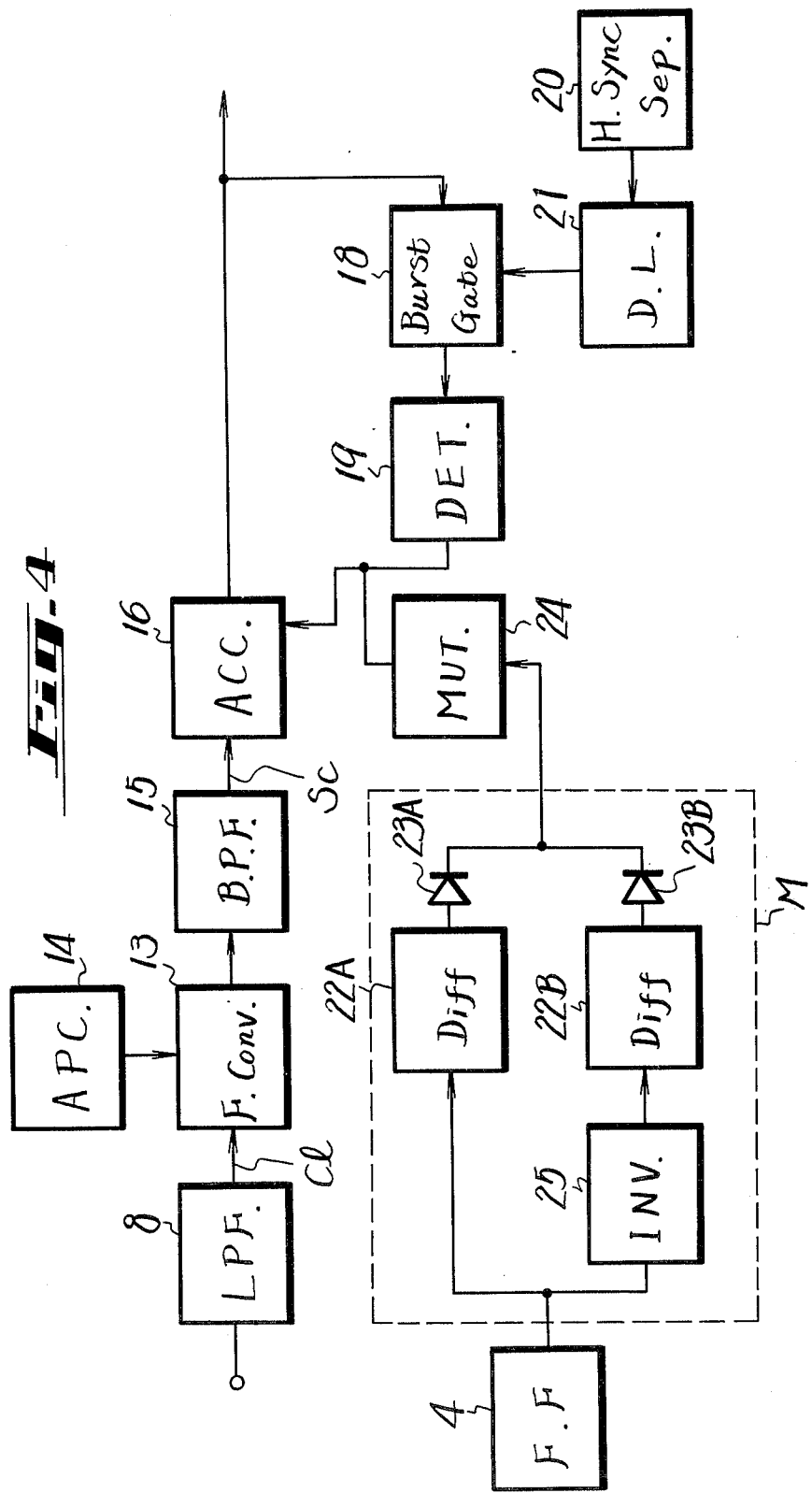

COLOR VIDEO SIGNAL REPRODUCING APPARATUS

BACKGROUND OF THE INVENTION

1. Field of the Invention

The present invention relates generally to a color television signal reproducing apparatus, and is directed more particularly to a color television signal reproducing apparatus having a circuit for avoiding erroneous operation of its AGC (automatic gain control) circuit.

2. Description of the Prior Art

In the prior art it is known to provide a VTR in which color video signals are recorded on a magnetic tape in obliquely extending successive tracks thereon and the color video signal for each field interval is recorded in a respective one of the tracks. Upon the reproduction thereof, the successive recorded tracks are sequentially reproduced by two rotary magnetic heads which are alternately switched. With this prior art VTR, when the video signals are sequentially reproduced from the successive recorded tracks by the two rotary heads, it can not be avoided that a transient noise is produced at the time when the two heads ae switched. Thus, when relative jitter variations between the rotary heads and magnetic tape are caused by the positional relation between the transient noise and color burst signal present in the vertical blanking interval of the video signal, a color flicker appears at the upper edge of a reproduced picture on a television receiver or monitor which color flicker may be uncomfortable for a viewer.

SUMMARY OF THE INVENTION

According to an aspect of the present invention, there is provided a video signal reproducing apparatus in which, in order to avoid misoperation during the vertical blanking period of an ACC (automatic color control) circuit in the reproducing circuit for the chrominance signal, the chrominance component of the reproduced color video signal is muted or the signal for controlling the ACC circuit is muted. Desirably, the muting signal is produced by a pulse signal from a phase control signal generator which is provided in association with the head drum of the VTR to indicate the rotary positions of the signal reproducing heads.

Accordingly, it is an object of the present invention to provide a video signal reproducing apparatus which is free of the above described defect inherent in the prior art apparatus.

It is another object of the invention to provide a video signal reproducing apparatus in which the appearance of any color flicker on a monitor television receiver is avoided even if jitter components exist.

It is a further object of the invention to provide a video signal reproducing apparatus in which an ACC circuit in the recording circuit of the VTR is improved in operation so as to eliminate a color flicker.

The above, and other objects, features and advantages of the invention, will become apparent from the following description taken in conjunction with the accompanying drawings.

BRIEF DESCRIPTION OF THE DRAWINGS

FIG. 1 is a schematic block diagram showing an embodiment of a video signal reproducing apparatus according to the invention;

FIGS. 2A to 2D and FIGS. 3A to 3C are waveform diagrams to which reference will be made in explaining the operation of a prior art VTR and of the embodiment of the invention shown in FIG. 1; and FIG. 4 is a schematic block diagram showing another embodiment of the invention.

DESCRIPTION OF THE PREFERRED EMBODIMENTS

An embodiment of the present invention will now be described with reference to FIG. 1 as applied to a color VTR of the type having two rotary magnetic heads, by way of example.

In the color video signal producing system of FIG. 1, reference numerals 1A and 1B indicate rotary magnetic heads which are located with an angular spacing therebetween of about 180° and rotated at a speed of 30 r.p.s. The magnetic heads 1A and 1B reproduce a color television signal from a magnetic tape (not shown) which travels about the periphery of a guide drum (not shown) through an angular extent of about 180°. The color television signal is recorded on the magnetic tape in a known manner so that its luminance signal is angle-modulated, for example, frequency-modulated, its chrominance signal is converted into a low band frequency signal, the angle-modulated luminance signal is combined with the frequency converted chrominance signal, and each interval of the resulting combined signal recorded in a respective oblique track on the magnetic tape. The magnetic heads 1A and 1B sequentially contact the magnetic tape for about one field interval to reproduce the color television signals which are then supplied through pre-amplifiers 2A and 2B to a switching circuit 3. The switching circuit 3 serves to pass therethrough one or the other of the signals reproduced by the magnetic heads 1A and 1B as the latter alternately contact the magnetic tape, and is actuated by a switching pulse from a flip-flop 4. In order to produce the switching pulse, there is provided a means for detecting the rotary phases of the magnetic heads 1A and 1B. As the rotary phase detecting means, there may be used a magnetic means or photo-electric means. In the example shown in FIG. 1, two detecting coils 5A and 5B are located on the rotary trace of the magnetic heads 1A and 1B with an angular spacing of 180° between the coils 5A and 5B, and a magnet (not shown) is rotated together with the magnetic heads 1A and 1B past the coils 5A and 5B. Thus, each of the detecting coils 5A and 5B produces a detecting pulse each 1/30 sec. to indicate the rotary phase or position of the magnetic heads 1A and 1B. Since the detecting pulses from the detecting coils 5A and 5B are shifted in phase by 180°, if the flip-flop 4 is triggered with the detecting pulses passed through amplifiers 6A and 6B, the flip-flop 4 may produce the switching pulse whose level changes between two values at the frequency of 60 c.p.s. Accordingly, at any time, the switching circuit 3 passes therethrough the signal being reproduced by the magnetic head which then contacts the tape. The detecting pulses from the detecting coils 5A and 5B are supplied to a servo circuit (not shown) for achieving the usual tracking servo operation during reproduction.

The reproduced signal passed through the switching circuit 3 is fed to high pass and low pass filters 7 and 8 respectively. From the high pass filter 7, is obtained a luminance signal $Y_{FM}$ which is frequency-modulated. This luminance signal $Y_{FM}$ is then supplied through a limiter 9 to a frequency demodulator 10 which produces a luminance signal Y. This luminance signal Y is fed to a low pass filter 11 which eliminates unnecessary signal components from the luminance signal Y and the output signal from the low pass filter 11 is fed to an adding circuit 12. From the low pass filter 8, there is obtained a frequency-converted chrominance signal $C_l$ which is supplied to a frequency converter 13. The chrominance signal $C_l$ is reconverted to the original frequency of chrominance subcarrier (in the case of the NTSC system, to 3.58 MH$_z$) by the frequency converter 13. An APC (automatic phase control) circuit 14 is provided in association with the frequency converter 13. The output signal from the frequency converter 13 is supplied to a band pass filter 15 in which unnecessary signal components are eliminated from the output signal of the frequency converter 13. Thus, from the band pass filter 15, is obtained a chrominance signal $S_C$ which is supplied to an ACC circuit 16 for removing level variations therein. The output signal from the ACC circuit 16 is then fed to the adding circuit 12 which is also supplied with the luminance signal Y as described above. Thus, the adding circuit 12 provides a composite color television signal including the luminance signal Y and chrominance signal $S_c$ and, which is delivered to an output terminal 17 led out from the adding circuit 12.

The ACC circuit 16 is supplied with a control signal which is obtained by extracting a burst signal from the output of ACC circuit 16 by means of a burst gate circuit 18 and detecting the level of the burst signal by a burst detecting circuit 19. The level of the burst signal is in proportion to that of the chrominance signal so that, for example, as the level of the chrominance signal becomes low, the level of the burst signal also becomes low. When the detected output signal of the burst detecting circuit 19 becomes small, the gain of the ACC circuit 16 is increased, whereas, when the detected output signal becomes great, the gain of the ACC circuit 16 is decreased. Thus, the chrominance signal is made constant in level or a so-called ACC operation is carried out. The burst gate circuit 18 is supplied with a burst flag pulse which is produced by delaying, through a delay circuit 21, a horizontal synchronizing signal extracted by a horizontal synchronizing signal separator 20 from the luminace signal passed by the low pass filter 11.

In accordance with this invention, the ACC operation is arrested during the switching from one to the other of the magnetic heads 1A and 1B, and more particularly at the commencement of each of the successive intervals of the color video signal being respectively reproduced by such heads. In the example of the invention shown in FIG. 1, the chrominance signal $S_C$ is muted during the commencement of each of the field intervals of the color video signal which are reproduced by the magnetic heads 1A and 1B, by utilizing the switching pulse from the flip-flop 4 which is, in turn, based upon the detecting pulses from coils 5A and 5B indicating the rotary phases of the magnetic heads 1A and 1B. To this end, the switching pulse from the flip-flop 4 is fed to a muting signal circuit M which includes a differentiation circuit 22A, and only the positive differentiated pulse therefrom is fed through a diode 23A as a muting signal to a muting circuit 24. The switching pulse from the flip-flop 4 is also fed in circuit M through a phase inverter 25 to another differentiation circuit 22B and the positive differentiated pulse therefrom is fed through a diode 23B as a muting signal to the muting circuit 24. The output side of the muting circuit 24 is connected to the transmission line of the chrominance signal $S_C$ between, for example, the band pass filter 15 and the ACC circuit 16. When the positive differentiated pulse is fed from each of the diodes 22A and 22B to the muting circuit 24, it operates, for example, to ground the chrominance signal transmission line and to cut off the transmission of the chrominance signal $S_C$ to the ACC circuit 16.

An error operation of the ACC circuit will now be described with reference to FIGS. 2A-2D for the case where the muting circuit 24 and the circuit M for driving the muting circuit 24 as shown in FIG. 1 are not provided, for example, as in a prior art color VTR of the two head type. Upon an error operation of the ACC circuit, the level of the chrominance signal $S_C$, which is reproduced and then converted, becomes low or high at the initial portion or commencement of one field interval $T_v$ or at the time after a vertical blanking period $T_{bl}$ as shown in FIGS. 2A or 2B and consequently a color flicker appears in a reproduced picture to deteriorate the same. The error operation of the ACC circuit is caused by a transient noise which may be produced at the switching of the switching circuit 3. In general, the switching time of the switching circuit 3 is selected to occur at the beginning of the vertical blanking period $T_{bl}$ as shown in FIG. 2C. The burst signal b is arranged in this period $T_{bl}$ and jitters exist in the VTR, so that when the transient noise t produced at switching is positioned as shown in FIG. 2D, the transient noise t may coincide with or deviate from the burst signal b as to time or position. For example if the transient noise t is coincident with the burst signal b, the transient noise appears in the output signal from the burst gate circuit 18. In general, the transient noise has a higher level than the burst signal in level, so that the detected output signal from the burst detecting circuit 19 increases and the gain of the ACC circuit 16 decreases. Since the recovery time period of the ACC circuit 16 is selected to be more than a certain value, for example, several ten times a horizontal period, the chrominance signal $S_C$ for the respective field interval, which is the output of the ACC circuit 16, has its level decreased during its initial portion as compared with the remaining portion as shown in FIG. 2A.

On the other hand, when the transient noise does not coincide in time with the burst signal, the transient noise does not appear in the output of the burst gate circuit 18. Accordingly, the output of the ACC circuit 16 is not affected by the transient noise. However, if the transient noise deviates, in time, from the burst signal after having been coincident with the latter for a certain time interval, the gain of the ACC circuit 16 itself increases during the vertical blanking period $T_{bl}$ in accordance with the recovery time thereof. Accordingly, the output signal of the ACC circuit 16 is increased in level during the initial portion of the field interval as compared with the remaining portion thereof as shown in FIG. 2B. The transient noise and burst signal in the reproduced signal become coincident or not due to the jitter like relative variation of the rotary heads to the recording medium which is scanned by the rotary heads. As a result, the color flicker in response to the jitters appears clearly in the upper portion of the picture which appears on a television receiver or monitor receiving the reproduced color video signal.

The manner in which the invention can avoid the above described erroneous operation of the ACC circuit will now be described with reference to FIGS. 3A-3C.

If the flip-flop 4 produces the switching pulse which rises up or falls down at the period of each field interval $T_v$ as shown in FIG. 3A, the switching circuit 3 is switched at the rising up times and falling down times $t_0, t_1, t_2, \ldots$. With the embodiment of this invention shown in FIG. 1, the switching pulse (FIG. 3A) from flip-flop 4 is differentiated by the differentiation circuit 22A, and the positive differentiated pulse therefrom is fed to the muting circuit 24. Further, the switching pulse shown in FIG. 3B, which is reversed in phase with respect to that shown in FIG. 3A, is differentiated by the differentiation circuit 22B and its positive going differentiated pulse is also fed to the muting circuit 24. As a result, the muting circuit 24 is supplied with the differentiated pulses produced at the times $t_0, t_1, t_2, \ldots$ when the switching circuit 3 is switched, as shown in FIG. 3C, and the muting operation is carried out for the time interval within which each differentiated pulse exists, so that the chrominance signal $S_C$ is not fed to the ACC circuit 16 during this interval to avoid erroneous operation of the ACC circuit 16 by the transient noise. Further, since the differentiated pulses (FIG. 3C) for controlling the muting circuit 24 are formed in response to the switching pulse, the differentiated pulse and transient noise are coincident with each other in time to positively avoid any influence by the transient noise on the ACC circuit 16.

In the above embodiment of the invention described above, the muting circuit 24 is provided in connection with the transmission line of the chrominance signal $S_C$. However, it is also possible to provide the muting circuit 24 in connection with the circuit which produces the control signal for the ACC circuit 16 and to thereby achieve the same effects, as shown in FIG. 4 by way of example. In FIG. 4, reference numerals that are the same as those used in FIG. 1 designate the same elements so that their description will be omitted for the sake of brevity.

Although the control signal for the ACC circuit 16 has been shown as being produced by detecting the burst signal, the present invention can also be applied to reproducing circuits in which the pilot signal and reference level signal in the video signal are used to produce the control signal for circuit 16.

Further, this invention can be adapted to a color VTR of the type having three, four or more rotary magnetic heads in addition to the type having two rotary magnetic heads.

The present invention can also be applied to apparatus in which signals recorded on a magnetic medium of sheet-like shape, rather than a magnetic tape, are reproduced.

Although illustrative embodiments of the invention have been described in detail herein, it will be apparent that many modifications and variations could be effected therein by one skilled in the art without departing from the spirit or scope of the present invention as defined in the appended claims.

I claim as my invention:

1. A video signal reproducing apparatus for reproducing a color video signal composed of luminance and chrominance components and having successive predetermined intervals which are respectively recorded in successive tracks extending parallel to one another on a record medium comprising:

a. at least two signal reproducing means which alternately scan the successive record tracks for reproducing the intervals of the color video signal respectively recorded therein;
   b. switching means for alternately switching said two signal reproducing means to provide in succession the intervals of the color video signal reproduced from said successive record tracks;
   c. an input terminal to which the chrominance components of said successive intervals of the reproduced color video signal are supplied from said signal reproducing means by way of said switching means;
   d. an output terminal from which a gain controlled chrominance component of the color video signal is derived;
   e. an automatic gain control circuit connected between said input and output terminals;
   f. level detecting means for detecting the output level of said automatic gain control circuit and providing a corresponding control signal output which is fed back to said automatic gain control circuit; and
   g. muting means for preventing the operation of said level detecting means for a predetermined period at the commencement of each said interval of said reproduced color video signal and by which the operation of said automatic gain control circuit is arrested for said predetermined period.

2. A video signal reproducing apparatus according to claim 1, wherein each of said successive predetermined intervals corresponds to one field interval of a composite color television signal.

3. A video signal reproducing apparatus according to claim 1, further comprising means by which said chrominance component of the color video signal reproduced by said signal reproducing means is frequency-converted into a substantially higher frequency band which corresponds to an original color band of the NTSC composite color television signal and is fed to said automatic gain control circuit.

4. A video signal reproducing apparatus according to claim 3, wherein said muting means acts on said chrominance component of the reproduced color video signal in advance of said automatic gain control circuit so that said level detecting means is prevented from detecting the output level of said automatic gain control circuit.

5. A video signal reproducing apparatus according to claim 3, wherein said muting means acts on said control signal output of said level detecting means.

6. A video signal reproducing apparatus according to claim 1, further comprising a head drum on which said two signal reproducing means are mounted, and means for producing a muting signal which is produced in response to the rotation of said head drum and which controls said muting means.

7. A video signal reproducing apparatus according to claim 6, wherein said means for producing a muting signal includes a phase-controlling signal generator coupled with said head drum, and a muting signal processing circuit receiving the output of said signal generator and through which said muting signal is fed to said muting means.

8. A video signal reproducing apparatus according to claim 7, wherein said switching means for alternately switching said two signal reproducing means is controlled by the output of said phase controlling signal generator.

* * * * *